United States Patent
Kwon (10) Patent No.: US 8,144,653 B2
(45) Date of Patent: Mar. 27, 2012

(54) MEDIUM ACCESS APPARATUS AND METHOD FOR PREVENTING A PLURALITY OF STATIONS IN A WIRELESS LOCAL AREA NETWORK FROM COLLIDING WITH ONE ANOTHER

(75) Inventor: Chang-yeul Kwon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1003 days.

(21) Appl. No.: 11/599,442

(22) Filed: Nov. 15, 2006

(65) Prior Publication Data

US 2007/0110091 A1    May 17, 2007

Related U.S. Application Data

(60) Provisional application No. 60/737,376, filed on Nov. 17, 2005.

(30) Foreign Application Priority Data

Mar. 16, 2006  (KR) .................. 10-2006-0024285

(51) Int. Cl.
*H04W 4/00*    (2009.01)
(52) U.S. Cl. .................. 370/329; 455/450; 455/435.1; 370/338
(58) Field of Classification Search .......... 370/336–338, 370/328; 455/422.1, 450, 454, 455
See application file for complete search history.

(56) References Cited

U.S. PATENT DOCUMENTS

| 8,069,248 B2 | 11/2011 | Sherman |
| 2002/0080813 A1 | 6/2002 | Kim |
| 2003/0148767 A1 | 8/2003 | Sugaya et al. |
| 2004/0114619 A1 | 6/2004 | Park et al. |
| 2005/0232275 A1 | 10/2005 | Stephens |
| 2008/0013496 A1* | 1/2008 | Dalmases et al. ............. 370/336 |
| 2010/0232452 A1 | 9/2010 | Takagi et al. |

FOREIGN PATENT DOCUMENTS

| JP | 2004-535695 A | 11/2004 |
| JP | 2005-198214 A | 7/2005 |

OTHER PUBLICATIONS

Syed Aon Mujtaba, TGn Sync Complete Proposal, Jan. 18, 2005, Agere Systems.*
Communication dated Nov. 29, 2011, issued by the Japanese Patent Office in counterpart Japanese Application No. 2008-541080.

* cited by examiner

*Primary Examiner* — Vladimir Magloire
(74) *Attorney, Agent, or Firm* — Sughrue Mion, PLLC (57) ABSTRACT

A method and apparatus for preventing a plurality of stations in a wireless local area network (WLAN) where a plurality of high throughput (HT) stations and a plurality of 802.11 legacy stations coexist from colliding are provided. The method includes generating a data frame having an HT format by inserting information indicating that a medium will be unavailable until the reception of an acknowledgement (ACK) frame is concluded into a physical layer (PHY) header having a format that can be interpreted by both the HT stations and the legacy stations; transmitting the data frame; and transmitting a reset frame which resets network allocation vectors (NAVs) of a plurality of stations which have heard the data frame, and has a format that can be interpreted by both the HT stations and the legacy stations. The apparatus includes a data frame generation unit; a reset frame generation unit; and a transmission unit.

20 Claims, 8 Drawing Sheets

MEDIUM ACCESS APPARATUS AND METHOD FOR PREVENTING A PLURALITY OF STATIONS IN A WIRELESS LOCAL AREA NETWORK FROM COLLIDING WITH ONE ANOTHER

CROSS-REFERENCE TO RELATED PATENT APPLICATION

This application claims priority from Korean Patent Application No. 10-2006-0024285, filed on Mar. 16, 2006, in the Korean Intellectual Property Office, and the benefit of priority from U.S. Provisional Application No. 60/737,376, filed on Nov. 17, 2005, the disclosures of which are incorporated herein in their entirety by reference.

BACKGROUND OF THE INVENTION

1. Field of the Invention

Apparatuses and methods consistent with the present invention relate to a wireless local area network (WLAN), and more particularly, to a method of preventing a plurality of stations in a WLAN, where a plurality of high throughput (HT) stations and a plurality of 802.11 legacy stations coexist, from colliding with one another.

2. Description of the Related Art

In a wireless local area network (WLAN), Carrier Sense Multiple Access with Collision Avoidance (CSMA/CA)-based Medium Access Control (MAC) methods are widely used. CSMA/CA is a type of data transmission method in which, even when no data is currently being transmitted via a network cable, a signal for determining whether data is currently being transmitted via the network cable is transmitted and data is transmitted only after the signal is determined to have been successfully transmitted without collision.

In detail, according to CSMA/CA, a first station detects a sub-carrier indicating whether there is a station currently transmitting data. If there is a station currently transmitting data, the first station stands by for a predetermined amount of time, determines whether there is a sub-carrier transmitted by another station, and begins to transmit data if no sub-carrier is currently being transmitted.

According to CSMA/CA, both a physical carrier sensing method and a virtual carrier sensing method are used at the same time. The physical carrier sensing method denotes a carrier sensing method in which a physical layer (PHY) determines whether a power of higher than a predefined value has been received and notifies a MAC layer of whether a medium is currently busy or idle based on the results of the determination, and the virtual carrier sensing method denotes a carrier sensing method in which, if a MAC protocol data unit (MPDU) can be properly extracted from a received Physical Layer Convergence Procedure (PLCP) protocol data unit (PPDU), stations interpret one of a plurality of header fields of the MPDU, i.e., a duration/identifier field of the MPDU, and determine whether a medium is currently busy based on the results of the interpretation. Stations use both the physical carrier sensing method and the virtual carrier sensing method to determine whether a medium is currently busy and do not attempt to access the medium if the medium is determined as being busy.

Figure 1A:
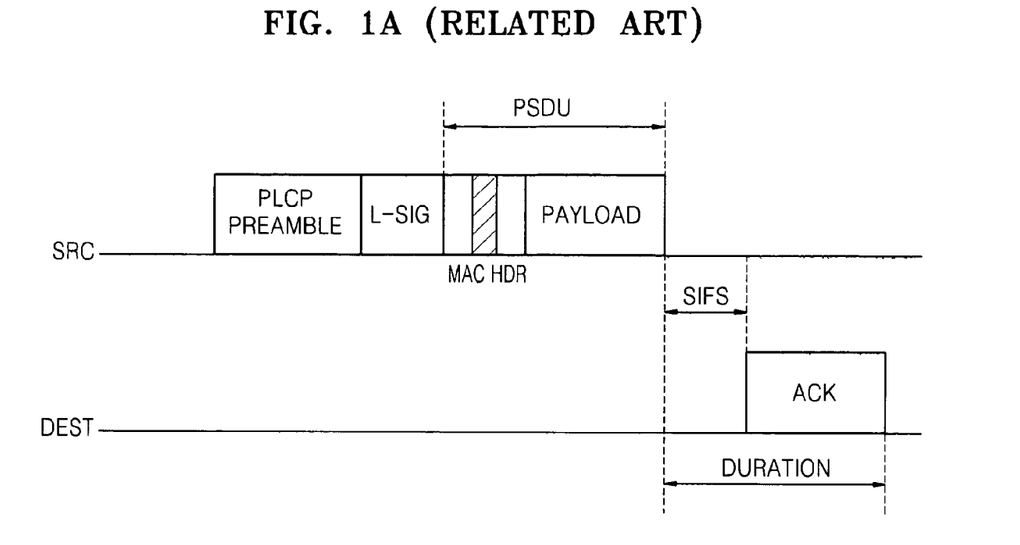
FIGS. 1A and 1B are diagrams illustrating the formats of related art frames for preventing a plurality of stations in a wireless local area network (WLAN) from colliding with each other.

Referring to FIG. 1A, a MAC header (MAC HDR) of a data frame (PSDU) which can be transmitted via a related art 802.11 WLAN includes duration information (DURATION) specifying the time required to receive an acknowledgement (ACK) frame in return for the data frame after the transmission of the data frame. A plurality of stations which receive the data frame interpret the MAC header of the data frame and do not attempt to access a medium during a predetermined time period specified in the MAC header of the data frame. Therefore, the stations can be prevented from colliding with one another. Due to the characteristics of a WLAN, all of a plurality of stations in a WLAN can hear frames regardless of whether the frames are destined for only one of the stations.

Figure 1B:
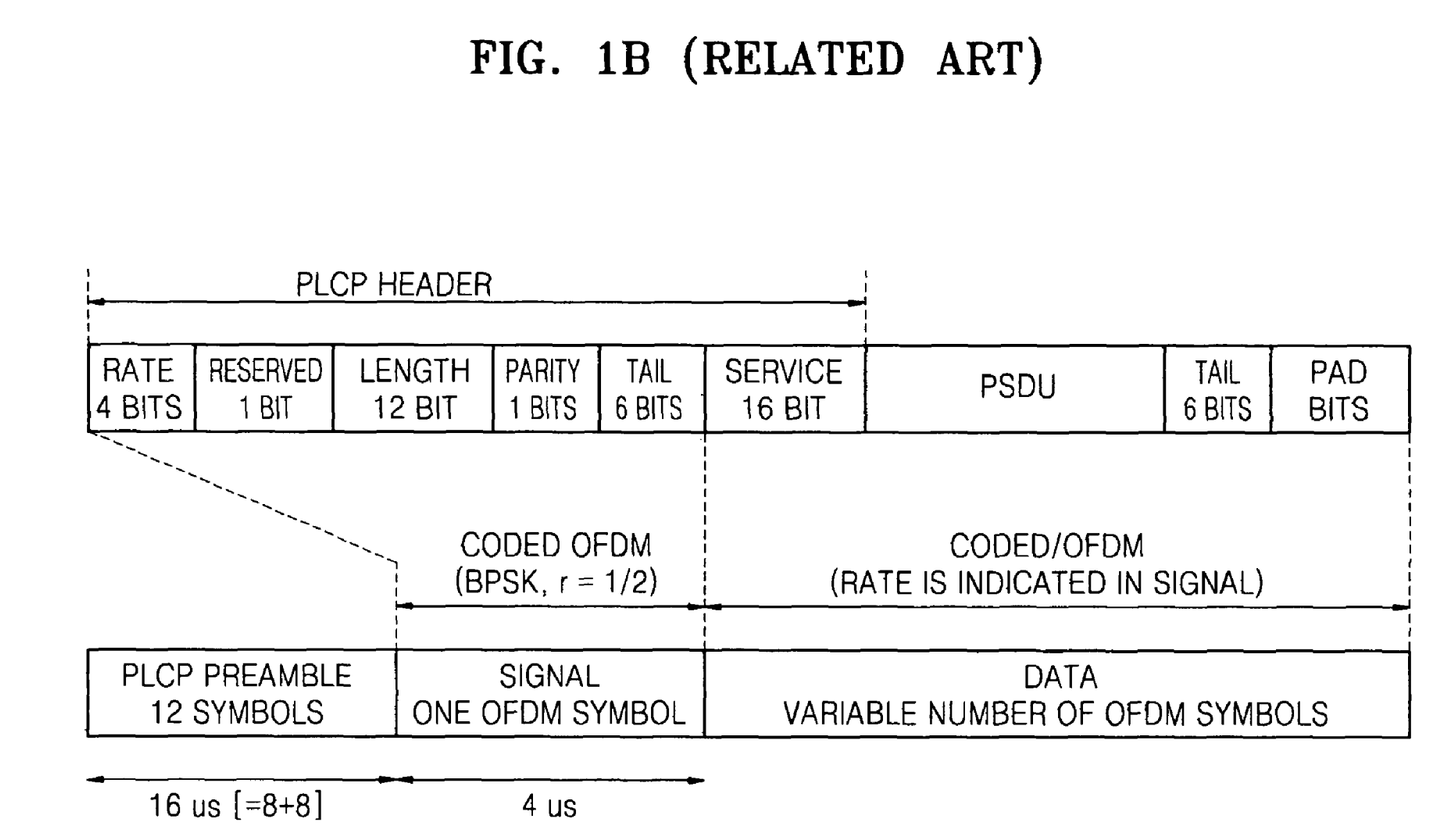

FIG. 1B is a diagram illustrating the format of a data frame which is used in a related art 802.11a network. Referring to FIG. 1B, a signal field of the 802.11a frame includes rate information (RATE) and length information (LENGTH). Thus, duration information of the data frame can be obtained by analyzing the rate information and the length information of the data frame. Therefore, the virtual carrier sensing method can be realized.

The virtual carrier sensing method can be effectively applied to CSMA/CA only when an MPDU/PHY service data unit (PSDU) can be interpreted properly without any errors, i.e., only when the value of a MAC header of a frame can be read out properly.

When errors occur due to an unstable channel state during the transmission of a frame at a high transmission rate by a transmitting station, or when a receiving station cannot properly handle the high transmission rate, or other similar errors, a received MPDU/PSDU cannot be interpreted properly. In this case, the virtual carrier sensing cannot be used, and thus, the performance of CSMA/CA decreases. Therefore, a plurality of listening stations are highly likely to collide with one another.

A high throughput (HT) station denotes a station such as a multi-input multi-output (MIMO) station which has better data transmission capabilities than an existing legacy station such as a station based on the IEEE 802.11a/b/g standard.

Figure 2:
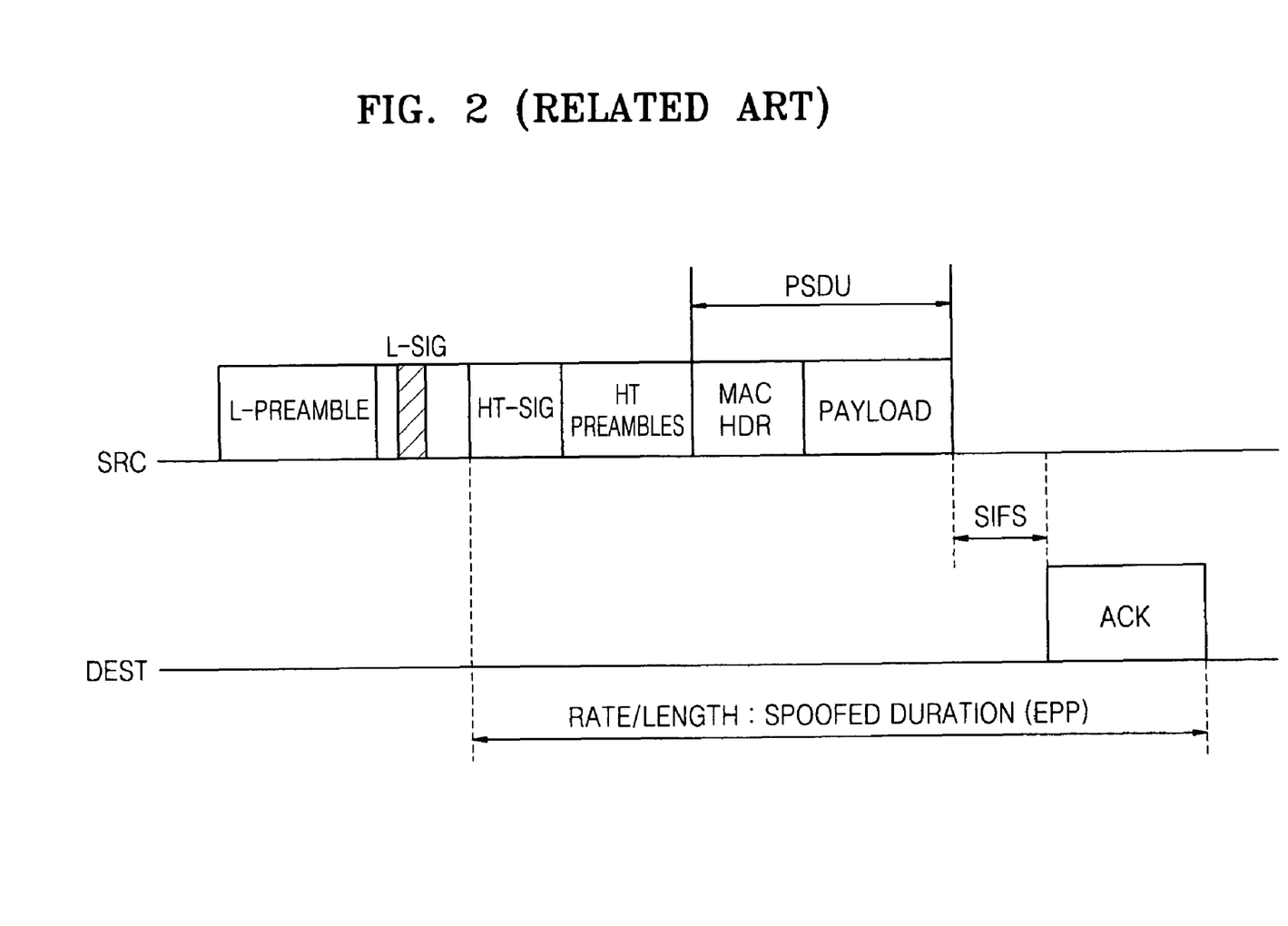
FIG. 2 is a diagram illustrating the format of a related art frame for preventing a plurality of stations in a WLAN where high throughput (HT) stations and legacy station coexist from colliding with each other.

In order to address the problem of such a high probability of a plurality of stations colliding with one another in a WLAN, a method based on the IEEE 802.11n standard which is currently being introduced has been suggested in which, when a plurality of HT stations and a plurality of legacy stations coexist in a WLAN, as illustrated in FIG. 2, a header having a legacy format (L-Preamble, L-SIG) is used as a PHY header of a frame to be transmitted and duration information which is previously included in an existing MAC header is included in the PHY header of the frame to be transmitted such that the duration information can represent the time taken to receive an ACK frame after L-SIG. The duration information will now be referred to as extended PHY protection (EPP) information.

Figure 3:
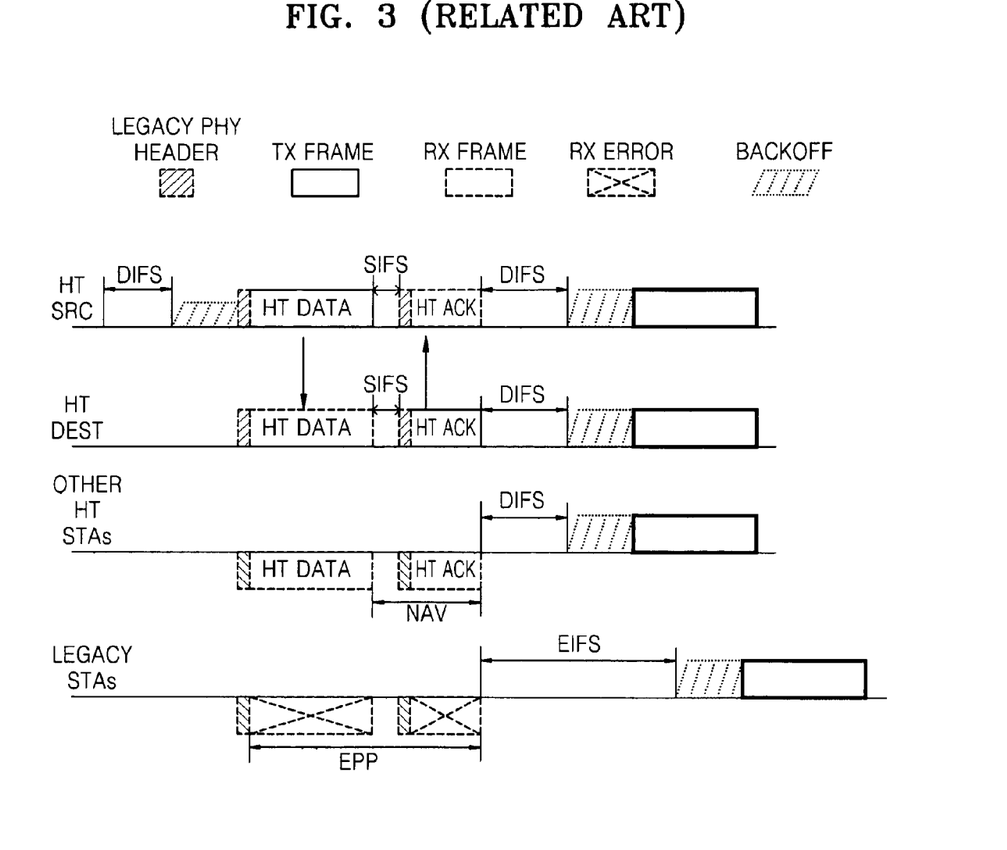
FIG. 3 is a diagram for explaining a related art method of controlling access of a plurality of stations to a medium by using the frame illustrated in FIG. 2.

FIG. 3 is a diagram for explaining a related art method of controlling the access of a plurality of stations to a medium by using extended PHY protection (EPP) information. Referring to FIG. 3, a plurality of stations can be prevented from colliding with one another by using the EPP information. However, the method illustrated in FIG. 3 results in unfairness regarding access to the medium among the stations.

Referring to FIG. 3, a plurality of legacy stations (LEGACY STAs) can interpret a PHY header of a data frame having a HT format. However, the legacy stations cannot interpret the remaining portions of the data frame, thus causing an error. Then a PHY layer (i.e., a baseband layer) notifies a MAC layer of the legacy stations that an error has occurred. The time when the PHY layer notifies the MAC layer of the legacy stations that an error has occurred coincides with the time when EPP information included in the data frame expires. Then the MAC layer of the legacy stations stands by for a predetermined amount of time corresponding to an extended interframe space (EIFS), whereas a plurality of HT stations stand by only for a predetermined amount of time corresponding to a distributed coordination function (DCF) interframe space (DIFS) and then contend for the use of the medium. Here, an EIFS is equal to the sum of a short interframe space (SIFS) and the time (hereinafter referred to as the ACK reception time) taken to receive an ACK frame in return for a data frame.

In other words, when an error occurs because the legacy stations cannot interpret a data frame having the HT format, the MAC layer of the legacy stations allows the legacy stations to begin to perform a backoff operation, i.e., an EIFS (whose duration is 94 μs as prescribed in the IEEE 802.11a standard) after the reception of the data frame, whereas a MAC layer of the HT stations allows the HT stations to begin to perform a backoff operation, i.e., a DIFS (whose duration is 34 us as prescribed in the IEEE 802.11a standard) after the reception of the data frame. Therefore, the legacy stations cannot participate in the contention for the access to the medium under fair conditions. A clear channel assessment (CCA) state of the legacy stations becomes idle after the reception of first HT data. However, since the time period specified in the EPP information has not yet elapsed, the legacy stations do not notify the MAC layer that an error has occurred until a time-out period of the timers of the legacy stations elapses, regardless of whether the legacy stations receive an ACK frame having the HT format or an ACK frame having the legacy format.

In short, legacy stations can start an EIFS only after EPP information expires, i.e., after the reception of an ACK frame, whereas HT stations can start a DIFS after the reception of the ACK frame. Therefore, legacy stations are at a disadvantage to HT stations when participating in contention for the use of a medium.

SUMMARY OF THE INVENTION

Exemplary embodiments of the present invention provide a method and apparatus for guaranteeing fairness regarding access to a medium among a plurality of stations in a wireless local area network (WLAN) where a plurality of high throughput (HT) stations and a plurality of legacy stations coexist.

According to an aspect of the present invention, there is provided a method of transmitting a data frame having a high throughput (HT) format to a wireless local area network (WLAN) where a plurality of HT stations and a plurality of legacy stations having different data transmission capabilities from the HT stations coexist. The method includes generating a data frame having an HT format by inserting information indicating that a medium will be unavailable until the reception of an acknowledgement (ACK) frame is concluded into a physical layer (PHY) header having a format that can be interpreted by both the HT stations and the legacy stations; transmitting the data frame; and transmitting a reset frame which resets network allocation vectors (NAVs) of a plurality of stations which have heard the data frame, and has a format that can be interpreted by both the HT stations and the legacy stations.

The transmission of the reset frame may include transmitting the reset frame before a distributed coordination function (DCF) interframe space (DIFS) elapses after the reception of the ACK frame.

The ACK frame may be a block ACK frame for a plurality of frames, and the data frame may be the first frame of the plurality of frames.

The reset frame may be a contention free (CF)-end frame or a quality-of-service (QOS) null frame.

According to another aspect of the present invention, there is provided a computer-readable recording medium storing a computer program for executing the method.

According to another aspect of the present invention, there is provided an apparatus for transmitting a data frame having a high throughput (HT) format to a WLAN where a plurality of HT stations and a plurality of legacy stations having different data transmission capabilities from the HT stations coexist. The apparatus includes a data frame generation unit which generates a data frame having an HT format by inserting information indicating that a medium will be unavailable until the reception of an acknowledgement (ACK) frame is concluded into a physical layer (PHY) header having a format that can be interpreted by both the HT stations and the legacy stations; a reset frame generation unit which generates a reset frame which resets NAVs of a plurality of stations which have heard the data frame, and has a format that can be interpreted by both the HT stations and the legacy stations; and a transmission unit which transmits the data frame and then the reset frame.

The data frame may be the first fragment frame of a plurality of fragment frames, and the ACK frame may be an ACK frame for the last fragment frame of the plurality of fragment frames.

BRIEF DESCRIPTION OF THE DRAWINGS

The above and other aspects of the present invention will become more apparent by describing in detail certain exemplary embodiments thereof with reference to the attached drawings in which.

DETAILED DESCRIPTION OF THE INVENTION

The present invention will now be described more fully with reference to the accompanying drawings in which certain exemplary embodiments of the invention are shown.

Figure 4:
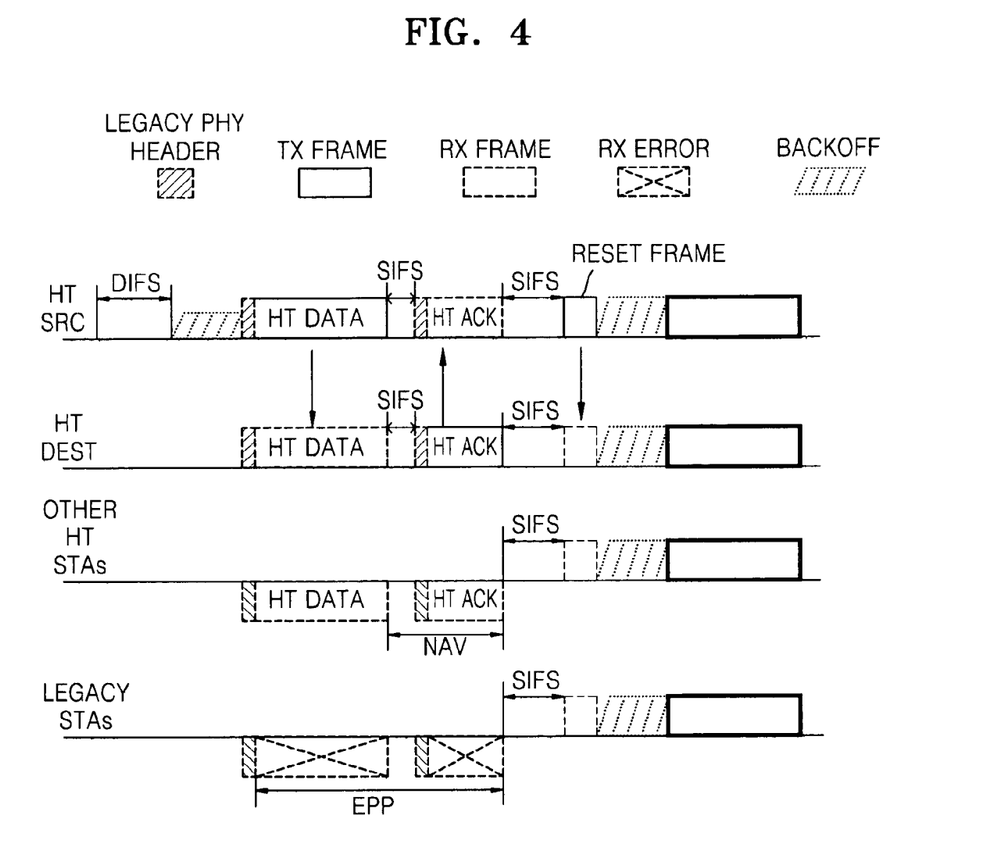
FIG. 4 is a diagram illustrating a medium access method of a plurality of stations according to an exemplary embodiment of the present invention.

FIG. 4 is a diagram illustrating a medium access method of a plurality of stations according to an exemplary embodiment of the present invention. Referring to FIG. 4, a high throughput (HT) station (hereinafter referred to as the transmitting HT station) according to an exemplary embodiment of the present invention transmits a data frame having an HT format, receives an acknowledgement (ACK) frame in return for the data frame, and transmits a reset frame, which is a control frame having the HT format, when a short interframe space (SIFS) elapses after the reception of the ACK frame. The reset frame is a control frame that resets the network allocation vector (NAV) timers of all stations. The reset frame is not restricted to a certain format. For example, a contention free (CF)-end frame which resets a medium access control (MAC) timer or a quality-of-service (QOS)-null frame which comprises a payloadless header may be used as the reset frame. FIG. 4 illustrates all stations which hear the reset frame as readily initiating a backoff operation. However, the stations which have received the reset frame may initiate a backoff operation when a certain time elapses after the reception of the reset frame. The certain time may be predetermined. In addition, the transmitting HT station is illustrated in FIG. 4 as transmitting the reset frame after an SIFS after the reception of the ACK frame. However, the transmitting HT station may transmit the reset frame after a certain time period, other than an SIFS, after the reception of the ACK frame. The certain time period may be predetermined.

In detail, a plurality of HT stations which have heard the ACK frame start to count down a distributed coordination function (DCF) interframe space (DIFS) after hearing the ACK frame, whereas a plurality of legacy stations start to count down an extended interframe space (EIFS) after hearing the ACK frame, as illustrated in FIG. 3, because extended physical layer (PHY) protection (EPP) information of the legacy stations has already expired. In anticipation that all this will happen, a transmitting HT station transmits a reset frame which equally resets the NAV timers of the HT stations and the NAV timers of the legacy stations so that the HT stations and the legacy stations can contend fairly for the use of a medium. Once receiving the reset frame, the HT stations and the legacy stations reset their NAV timers regardless of whether they are currently counting a DIFS or an EIFS and can thus participate in contention for the use of the medium at the same time. Since the HT stations begin to perform a backoff operation a DIFS after the reception of the ACK frame, the transmitting HT station may transmit the reset frame within a DIFS after the transmission of the ACK frame.

Figure 5:
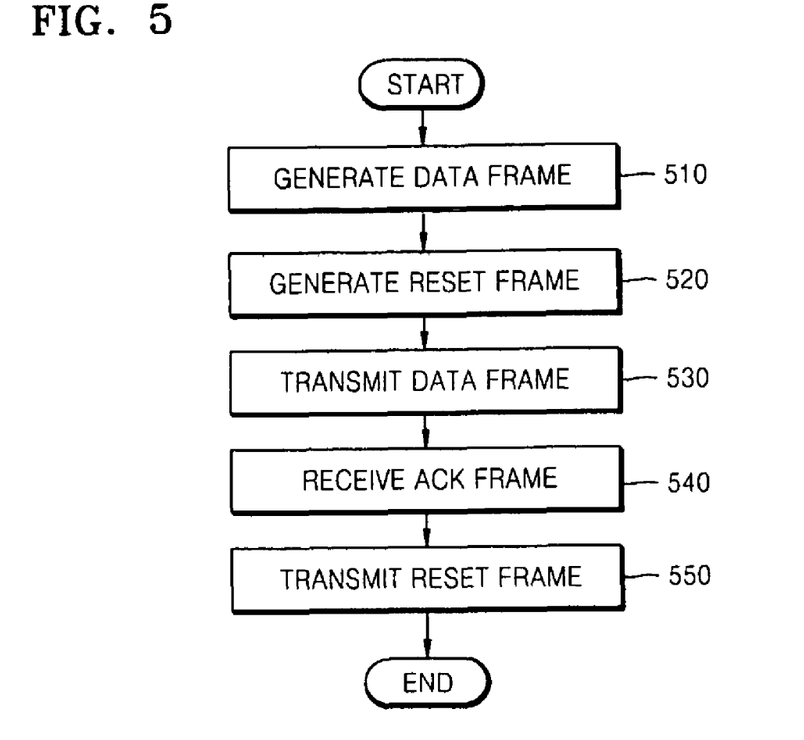
FIG. 5 is a flowchart illustrating an operation of a high throughput (HT) station according to an exemplary embodiment of the present invention.

FIG. 5 is a flowchart illustrating an operation of an HT station according to an exemplary embodiment of the present invention. Referring to FIG. 5, a transmitting station which attempts to transmit a data frame having an HT format can determine in advance the time taken to receive an ACK frame in return for a data frame. Thus, in operation 510, the transmitting station generates a data frame having an HT format by inserting information indicating the time taken to receive an ACK frame in return for the data frame, i.e., EPP information, into a PHY header having a legacy format. In operation 520, the transmitting station generates a reset frame which resets the NAV timers of a plurality of HT stations and a plurality of legacy stations alike in a wireless local area network (WLAN). In operation 530, the transmitting station transmits the data frame generated in operation 510 via the WLAN. In operation 540, an ACK frame is received. In operation 550, the transmitting station transmits the reset frame a certain time period after the transmission of the data frame. The certain time period may be predetermined. As described above, a CF-end frame or a QOS-null frame may be used as the reset frame. The generation of the reset frame may be performed in other than operation 520.

Figure 6:
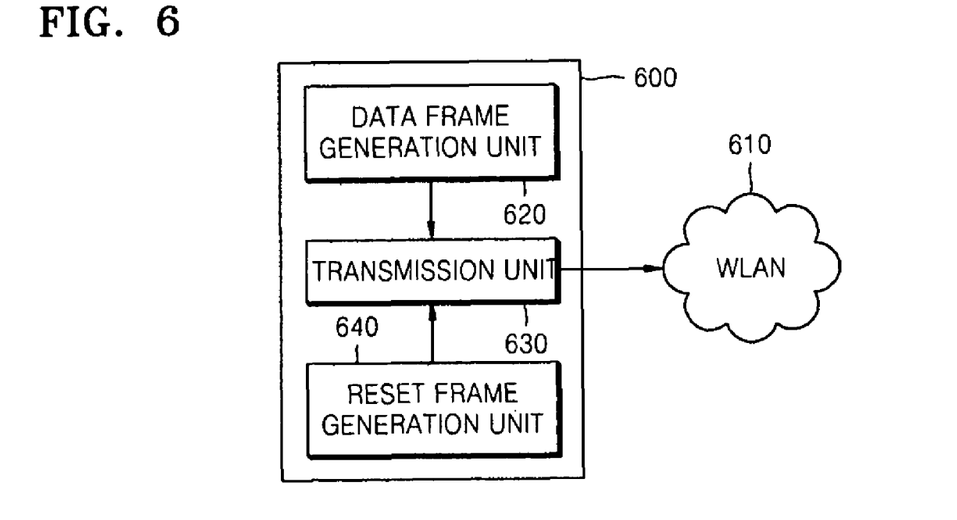
FIG. 6 is a block diagram of an HT station according to an exemplary embodiment of the present invention.

FIG. 6 is a block diagram of an HT station according to an exemplary embodiment of the present invention. Referring to FIG. 6, the HT station 600 includes a data frame generation unit 620, a transmission unit 630, and a reset frame generation unit 640.

The data frame generation unit 620 generates a data frame having an HT format by inserting EPP information indicating that a medium will be unavailable until the transmission of an ACK frame is concluded into a PHY header having a format that can be interpreted by both HT stations and legacy stations. The reset frame generation unit 640 generates a reset frame having a format that can be interpreted by both HT stations and legacy stations and resets the NAV timers of a plurality of stations which have heard the data frame generated by the data frame generation unit 620.

The transmission unit 630 transmits the data frame generated by the data frame generation unit 620 and the reset frame generated by the reset frame generation unit 640 via a WLAN 610. In detail, as described above, the transmission unit 630 may transmit the data frame generated by the data frame generation unit 620 and transmit the reset frame generated by the reset frame generation unit 640 an SIFS after the transmission of the data frame generated by the data frame generation unit 620.

The HT station according to an exemplary embodiment of the present invention has been described above as transmitting a single data frame and receiving an ACK frame in return for the single data frame. However, the present inventive concept can also be applied to a frame exchange sequence where an HT station transmits a plurality of frames and receives a block ACK frame in return for the frames. This will now be described in detail with reference to FIGS. 7 and 8.

Figure 7:
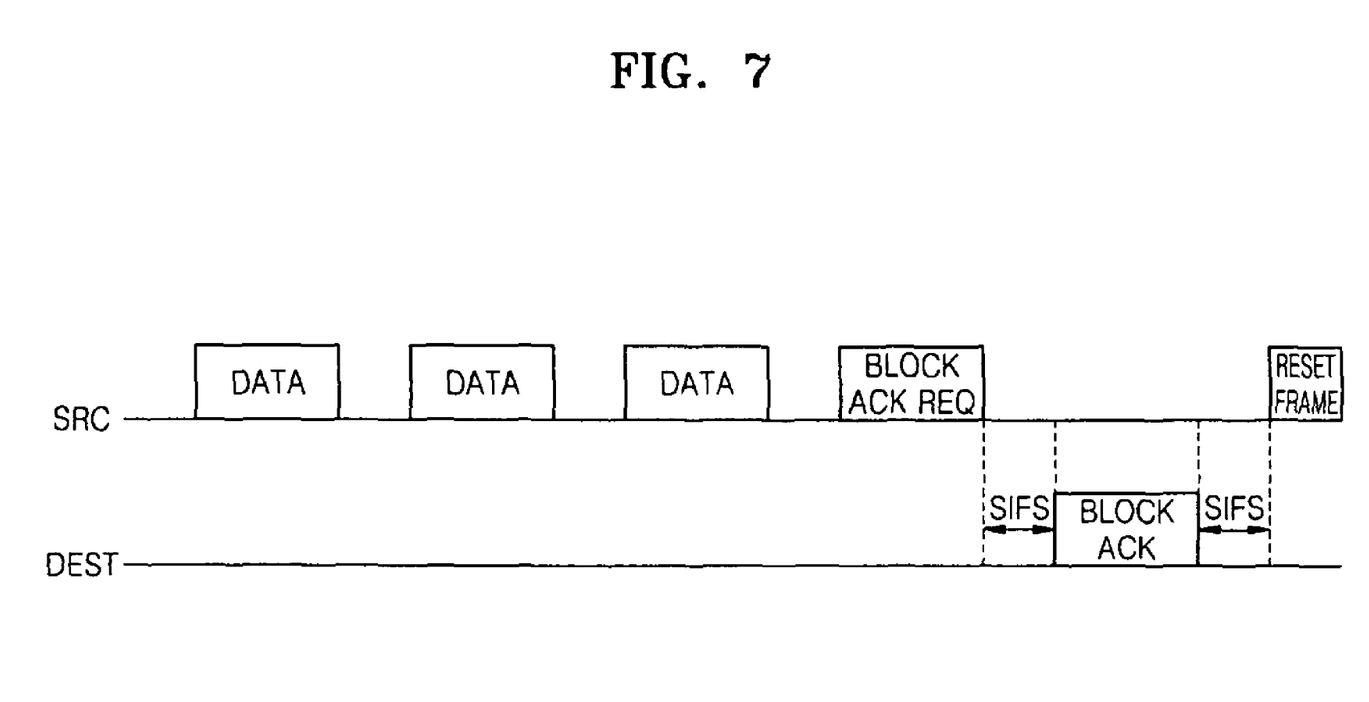
FIG. 7 is a diagram illustrating a medium access method of a plurality of stations in a sequence where a block acknowledgement (ACK) frame is used according to an exemplary embodiment of the present invention.

FIG. 7 is a diagram illustrating a method of providing fairness regarding access to a medium among a plurality of stations in a sequence where a block ACK frame is used according to an exemplary embodiment of the present invention. In general, a transmitting station transmits a single data frame and receives an ACK frame in return for the single data frame. However, referring to FIG. 7, a transmitting station (SRC) may transmit a plurality of frames and issue a request for information indicating whether each of the plurality of frames have been successfully received by a receiving station. Then the receiving station (DEST) may transmit a block ACK frame in return for all the plurality of frames to indicate whether each of the plurality of frames has been successfully received by the receiving station. In this case, a PHY header which is of the first frame of the plurality of frames and has a legacy format includes information regarding EPP which expires when the transmission of the block ACK frame is concluded, and the transmitting station transmits a reset frame when an SIFS elapses after the reception of the block ACK frame.

Figure 8:
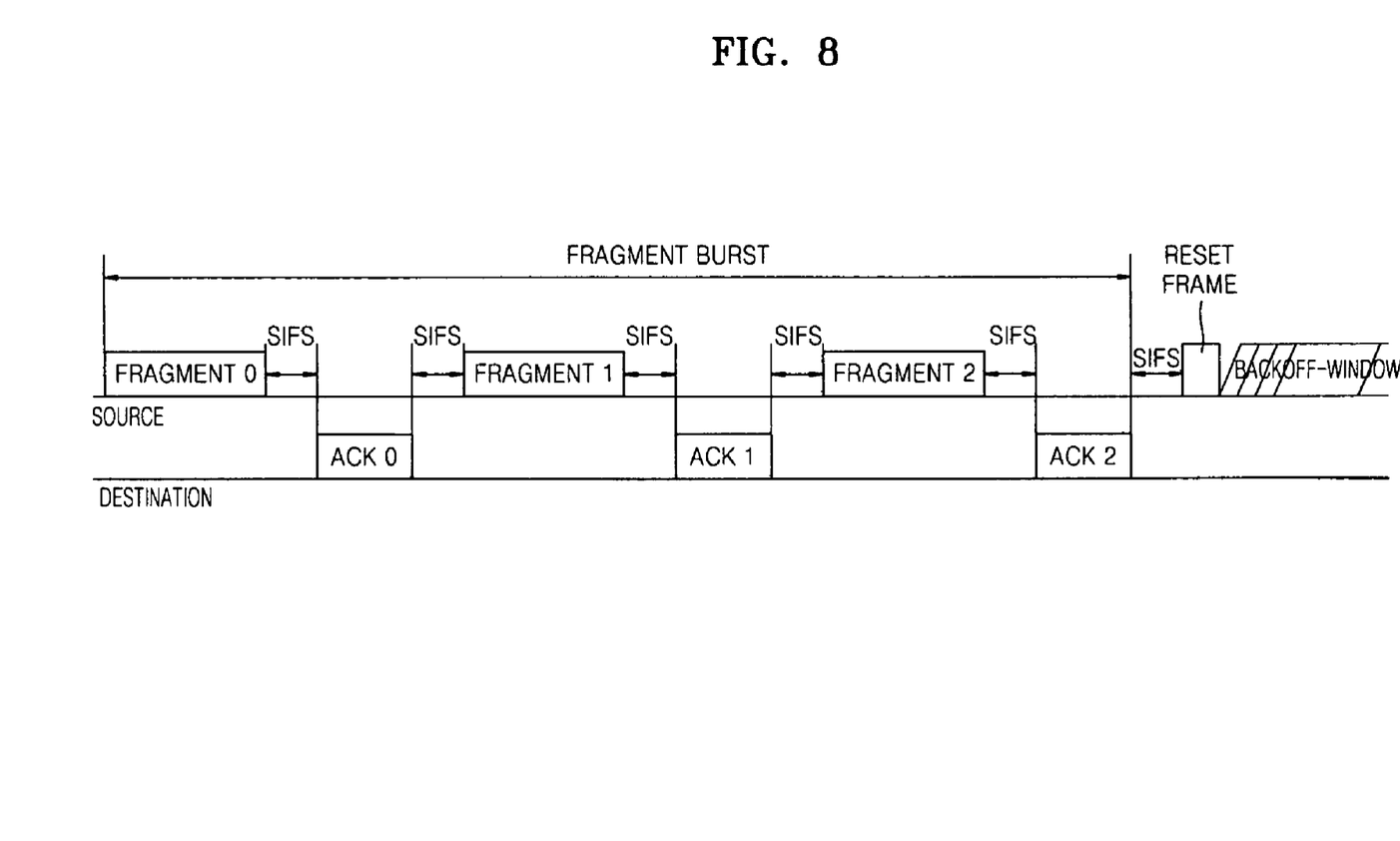
FIG. 8 is a diagram illustrating a medium access method of a plurality of stations in a sequence where a plurality of fragment frames are transmitted according to an exemplary embodiment of the present invention.

FIG. 8 is a diagram illustrating a method of providing fairness regarding access to a medium among a plurality of stations in a sequence where a plurality of fragment frames are transmitted according to an exemplary embodiment of the present invention. Referring to FIG. 8, a transmitting station (SOURCE) divides a single frame into three fragment frames, i.e., zeroth through second fragment frames (FRAGMENT 0, FRAGMENT 1, FRAGMENT 2), and transmits the zeroth through second fragment frames. Then a receiving station respectively transmits zeroth through second ACK frames (ACK 0, ACK 1, ACK 2) in return for the zeroth through second fragment frames, instead of transmitting one ACK frame in return for all of the zeroth through second fragment frames. In this exemplary embodiment of the present invention, like in the previous exemplary embodiment illustrated in FIG. 7, a PHY header which is of the zeroth fragment frame and has a legacy format includes information regarding EPP which is set to expire when the transmission of the second ACK frame is concluded. According to this exemplary embodiment of the present invention, the transmitting station transmits a reset frame after an SIFS after the reception of the second ACK frame.

The present inventive concept can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage.

According to exemplary embodiments of the present invention, when a transmitting HT station transmits a frame having a HT format in a WLAN environment where a plurality of HT stations and a plurality of legacy stations coexist, a hearing legacy station can contend for access to a medium under the same conditions as other HT stations without making additional changes to the hearing legacy station.

While the present invention has been particularly shown and described with reference to certain exemplary embodiments thereof, it will be understood by those of ordinary skill in the art that various changes in form and details may be made therein without departing from the spirit and scope of the present invention as defined by the following claims.

What is claimed is:

1. A method of transmitting a data frame having a high throughput (HT) format to a wireless local area network (WLAN) where a plurality of HT stations and a plurality of legacy stations coexist, the method comprising:
   generating a data frame having an HT format by inserting information indicating that a medium will be unavailable until the reception of an acknowledgement (ACK) frame is concluded into a physical layer (PHY) header having a format that can be interpreted by both the HT stations and the legacy stations;
   transmitting the data frame; and
   transmitting a reset frame which equally resets network allocation vectors (NAVs) of a plurality of stations including the HT stations and the legacy stations which have heard the data frame, and the reset frame has a format that can be interpreted by both the HT stations and the legacy stations,
   wherein the transmission of the reset frame comprises transmitting the reset frame before a distributed coordination function (DCF) interframe space (DIFS) elapses after the reception of the ACK frame.

2. The method of claim 1, wherein the ACK frame is received in return for the data frame.

3. The method of claim 1, wherein the ACK frame is a block ACK frame for a plurality of frames, and the data frame is the first frame of the plurality of frames.

4. The method of claim 1, wherein the data frame is the first fragment frame of a plurality of fragment frames, and the ACK frame is an ACK frame for the last fragment frame of the plurality of fragment frames.

5. The method of claim 1, wherein the transmission of the reset frame comprises transmitting the reset frame when a short interframe space (SIFS) elapses after the reception of the ACK frame.

6. The method of claim 1, wherein the reset frame is a contention free (CF)-end frame or a quality-of-service (QOS) null frame.

7. The method of claim 1, wherein the WLAN is an infrastructure basic service set (BSS) or an independent basic service set (IBSS).

8. The method of claim 1, wherein each of the legacy stations is at least one of an IEEE 802.11a station, an IEEE 802.11b station, and an IEEE 802.11g station.

9. The method of claim 1, wherein the HT stations are multi-input-multi-output (MIMO) stations.

10. A non-transitory computer-readable recording medium storing a computer program for executing a method comprising:
    generating a data frame having an HT format by inserting information indicating that a medium will be unavailable until the reception of an acknowledgement (ACK) frame is concluded into a physical layer (PHY) header having a format that can be interpreted by both the HT stations and the legacy stations;
    transmitting the data frame; and
    transmitting a reset frame which equally resets network allocation vectors (NAVs) of a plurality of stations including the HT stations and the legacy stations which have heard the data frame, and the reset frame has a format that can be interpreted by both the HT stations and the legacy stations,
    wherein the transmission of the reset frame comprises transmitting the reset frame before a distributed coordination function (DCF) interframe space (DIFS) elapses after the reception of the ACK frame.

11. The computer-readable recording medium of claim 10, wherein the ACK frame is received in return for the data frame.

12. An apparatus for transmitting a data frame having a high throughput (HT) format to a WLAN where a plurality of HT stations and a plurality of legacy stations coexist, the apparatus comprising:
    a data frame generation unit which generates a data frame having an HT format by inserting information indicating that a medium will be unavailable until the reception of an acknowledgement (ACK) frame is concluded into a physical layer (PHY) header having a format that can be interpreted by both the HT stations and the legacy stations;
    a reset frame generation unit which generates a reset frame which equally resets network allocation vectors (NAVs) of a plurality of stations including the HT stations and the legacy stations which have heard the data frame, and the reset frame has a format that can be interpreted by both the HT stations and the legacy stations; and
    a transmission unit which transmits the data frame and then the reset frame,
    wherein the transmission unit transmits the reset frame before a distributed coordination function (DCF) interframe space (DIFS) elapses after the reception of the ACK frame.

13. The apparatus of claim 12, wherein the ACK frame is received in return for the data frame.

14. The apparatus of claim 12, wherein the ACK frame is a block ACK frame for a plurality of frames, and the data frame is the first frame of the plurality of frames.

15. The apparatus of claim 12, wherein the data frame is the first fragment frame of a plurality of fragment frames, and the ACK frame is an ACK frame for the last fragment frame of the plurality of fragment frames.

16. The apparatus of claim 12, wherein the transmission unit transmits the reset frame when a short interframe space (SIFS) elapses after the reception of the ACK frame.

17. The apparatus of claim 12, wherein the reset frame is a contention free (CF)-end frame or a quality-of-service (QOS) null frame.

18. The apparatus of claim 12, wherein the WLAN is an infrastructure basic service set (BSS) or an independent basic service set (IBSS).

19. The apparatus of claim 12, wherein each of the legacy stations is at least one of an IEEE 802.11a station, an IEEE 802.11b station, and an IEEE 802.11g station.

20. The apparatus of claim 12, wherein the HT stations are multi-input-multi-output (MIMO) stations.

* * * * *